(12) United States Patent
Balkus, Jr.

(10) Patent No.: US 8,196,855 B2
(45) Date of Patent: Jun. 12, 2012

(54) HELICOPTER AUXILIARY ANTI-TORQUE SYSTEM

(76) Inventor: Carl E. Balkus, Jr., Happy Camp, CA (US)

( * ) Notice: Subject to any disclaimer, the term of this patent is extended or adjusted under 35 U.S.C. 154(b) by 346 days.

(21) Appl. No.: 12/623,684

(22) Filed: Nov. 23, 2009

(65) Prior Publication Data

US 2011/0121128 A1    May 26, 2011

(51) Int. Cl.
  *B64C 27/82* (2006.01)
(52) U.S. Cl. ............... 244/17.19; 244/17.11; 244/17.13; 244/17.21
(58) Field of Classification Search ............... 244/17.21, 244/17.13, 17.19, 99.4
  See application file for complete search history.

(56) References Cited

U.S. PATENT DOCUMENTS

| | | | | |
|---|---|---|---|---|
| 2,225,002 A | * | 12/1940 | Focke | 244/17.21 |
| 2,317,340 A | | 4/1943 | Bennett | |
| 2,420,784 A | * | 5/1947 | Larsen | 244/17.21 |
| 2,514,205 A | * | 7/1950 | McDonald | 244/17.11 |
| 2,514,206 A | * | 7/1950 | Perry | 244/17.11 |
| 2,702,084 A | * | 2/1955 | Focke | 416/122 |
| 2,782,861 A | | 2/1957 | Lent | |
| 3,227,399 A | | 1/1966 | Dastoli et al. | |
| 4,347,997 A | * | 9/1982 | Byham et al. | 244/17.19 |
| 4,648,568 A | * | 3/1987 | Phillips | 244/17.19 |
| 4,948,068 A | | 8/1990 | VanHorn | |
| 5,232,183 A | | 8/1993 | Rumberger | |
| 5,240,205 A | * | 8/1993 | Allongue | 244/17.19 |
| 5,649,678 A | | 7/1997 | Nurick | |
| 5,782,431 A | | 7/1998 | Gal-Or et al. | |
| 6,036,141 A | | 3/2000 | Clay | |
| 7,032,860 B1 | * | 4/2006 | Kirk et al. | 244/17.19 |
| 7,077,358 B1 | | 7/2006 | Quartarone | |
| RE42,446 E | * | 6/2011 | Kirk et al. | 244/17.19 |
| 2007/0295857 A1 | * | 12/2007 | Lloyd | 244/17.19 |
| 2009/0101753 A1 | * | 4/2009 | Kassai et al. | 244/17.19 |

* cited by examiner

*Primary Examiner* — Timothy D Collins
*Assistant Examiner* — Michael A Fabula
(74) *Attorney, Agent, or Firm* — Neustel Law Offices

(57) ABSTRACT

A helicopter auxilary anti-torque system for efficiently supplying thrust and control at the tail of a helicopter during failure of the helicopter tail rotor. The helicopter auxilary anti-torque system generally includes a fluid thrust assembly selectively engageable onboard the helicopter, an auxiliary tail rotor selectively engageable onboard the helicopter, and at least one controller to operate the fluid thrust assembly and the auxiliary tail rotor to effect a controlled anti-torque force of the tail boom during failure of the conventional helicopter tail rotor. The fluid thrust assembly projects a non flammable fluid from the tail boom of the helicopter. The auxiliary tail rotor is collapsible within the tail boom of the helicopter when not in use. The fluid thrust assembly and the auxiliary tail rotor may be automatically activated in the case of the primary tail rotor failure, or activated by the pilot of the helicopter via one or more switches.

20 Claims, 8 Drawing Sheets

HELICOPTER AUXILIARY ANTI-TORQUE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a helicopter thrust systems and more specifically it relates to a helicopter auxilary anti-torque system for efficiently supplying thrust and control at the tail of a helicopter during failure of the helicopter tail rotor.

2. Description of the Related Art

Any discussion of the related art throughout the specification should in no way be considered as an admission that such related art is widely known or forms part of common general knowledge in the field.

Helicopters generally include a main rotor and a tail rotor. The tail rotor prevents provides an anti-torque force upon the fuselage of the helicopter to prevent the helicopter from going into a spin via the rotation of the main rotor. When the tail rotor becomes damaged due to flying in dangerous conditions, debris, birds, or various other obstacles, there is generally nothing to prevent the helicopter from going into a spin, which inevitably ends up in a crash of the helicopter. Because of the inherent problems with the related art, there is a need for a new and improved helicopter auxiliary anti-torque system for efficiently supplying thrust and control at the tail of a helicopter during failure of the helicopter tail rotor.

BRIEF SUMMARY OF THE INVENTION

A system for efficiently supplying thrust and control at the tail of a helicopter during failure of the helicopter tail rotor. The invention generally relates to a helicopter thrust system which includes a fluid thrust assembly selectively engageable onboard the helicopter, an auxiliary tail rotor selectively engageable onboard the helicopter, and at least one controller to operate the fluid thrust assembly and the auxiliary tail rotor to effect a controlled anti-torque force of the tail boom during failure of the conventional helicopter tail rotor. The fluid thrust assembly projects a non flammable fluid from the tail boom of the helicopter. The auxiliary tail rotor is collapsible within the tail boom of the helicopter when not in use. The fluid thrust assembly and the auxiliary tail rotor may be automatically activated in the case of the primary tail rotor failure, or activated by the pilot of the helicopter via one or more switches.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
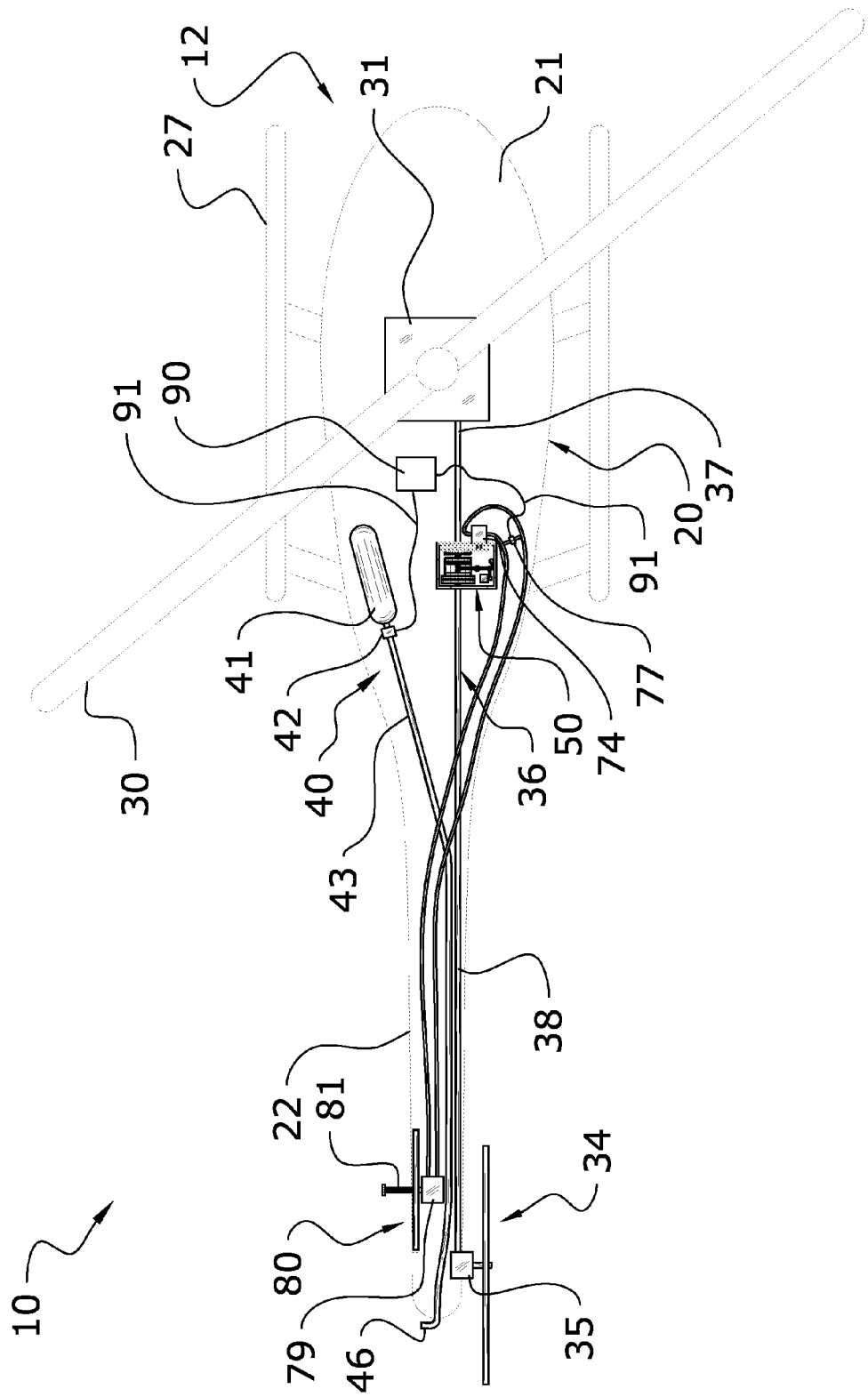
FIG. 1 is a functional diagram of the present invention within a helicopter and during operation of the standard tail rotor.
Figure 2:
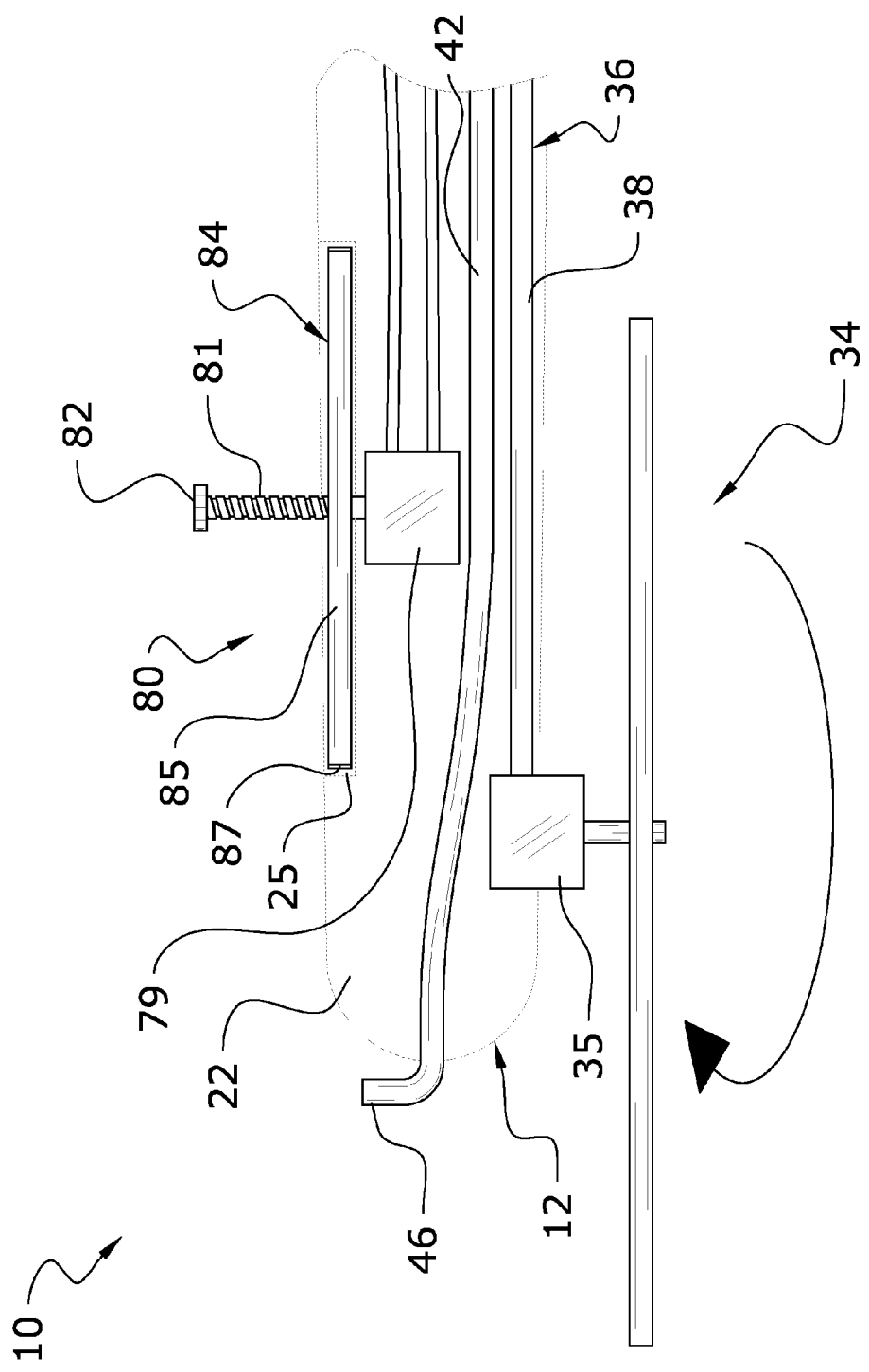
FIG. 2 is an illustration of the standard tail rotor operating and the auxiliary tail rotor in a collapsed position within the pocket (first position).
Figure 3:
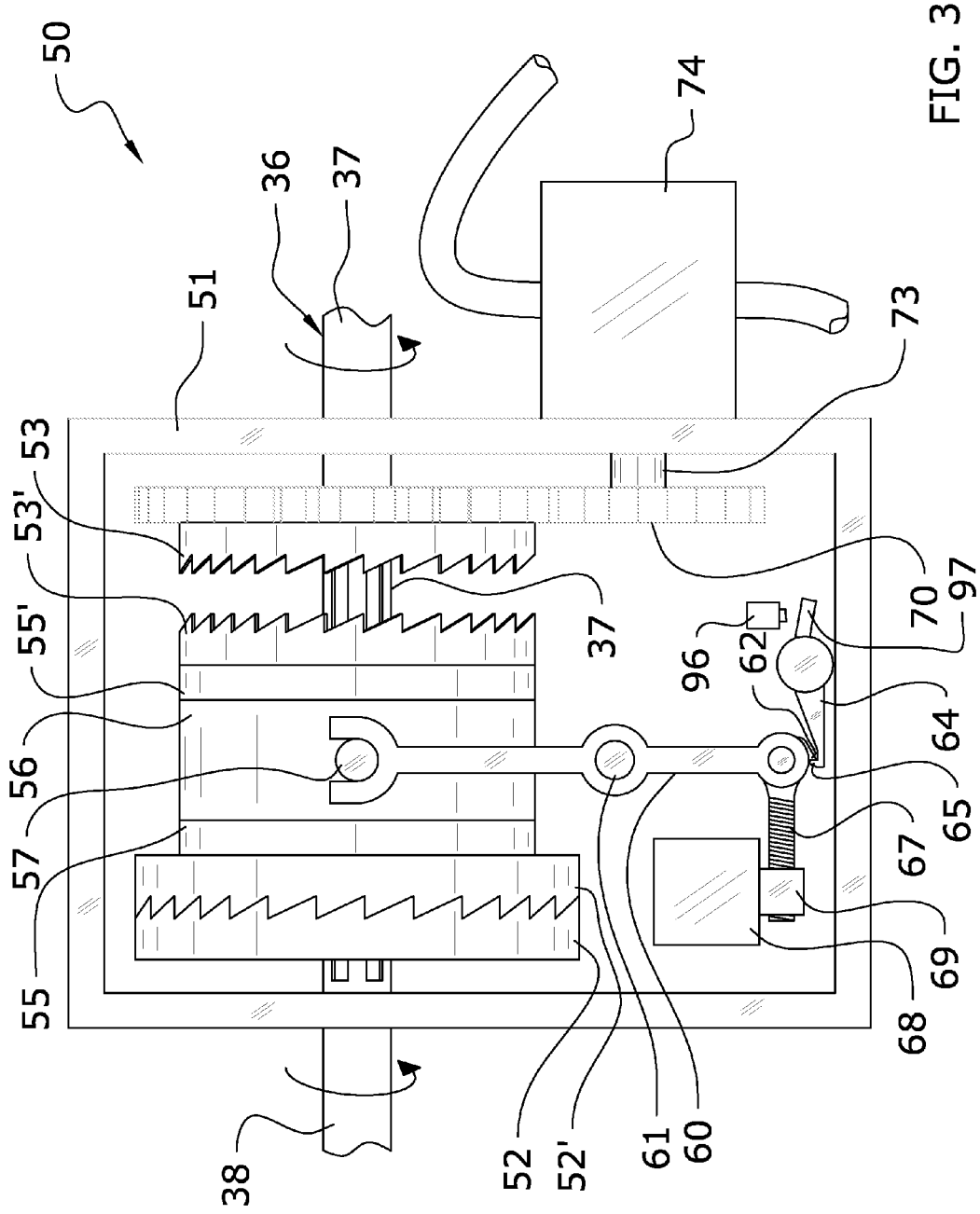
FIG. 3 is an illustration of the bypass assembly during operation of the tail rotor as shown in FIG. 1 and FIG. 2.
Figure 4:
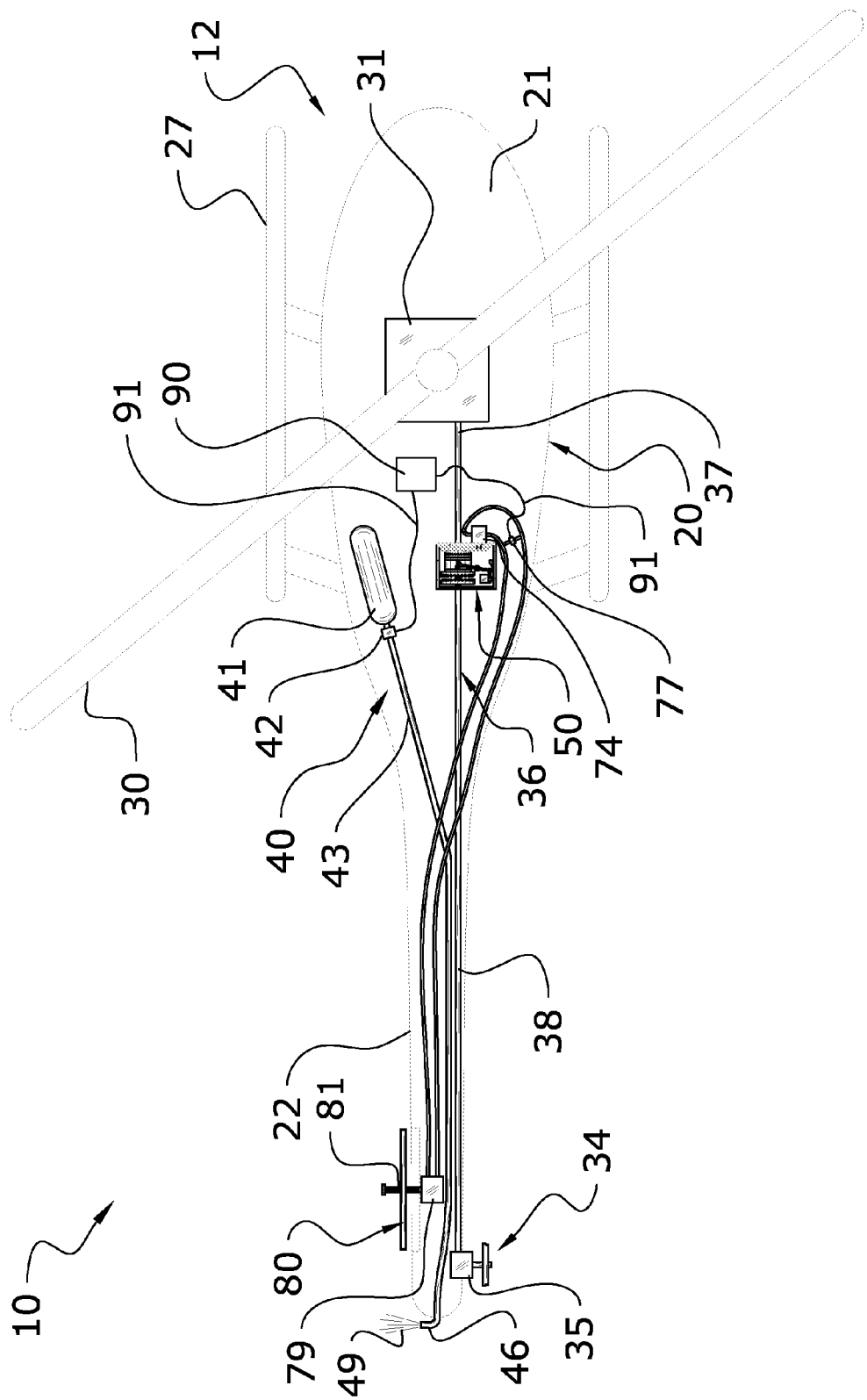
FIG. 4 is a functional diagram of the present invention within a helicopter and during operation of the fluid thrust assembly with the auxiliary tail rotor beginning to move into position and the damaged tail rotor being disconnected.
Figure 5:
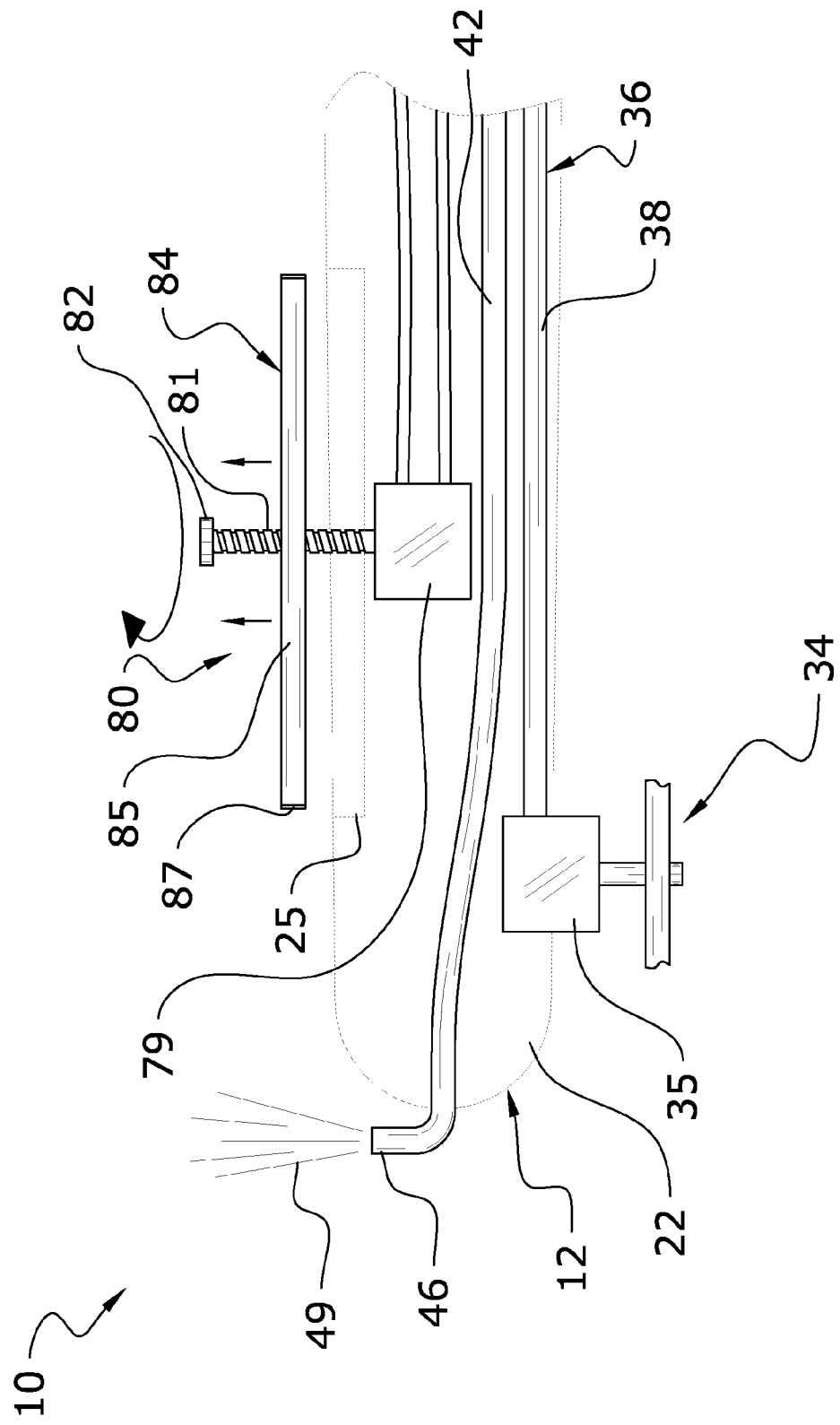
FIG. 5 is an illustration of the fluid thrust assembly with the auxiliary tail rotor beginning to move into position.
Figure 6:
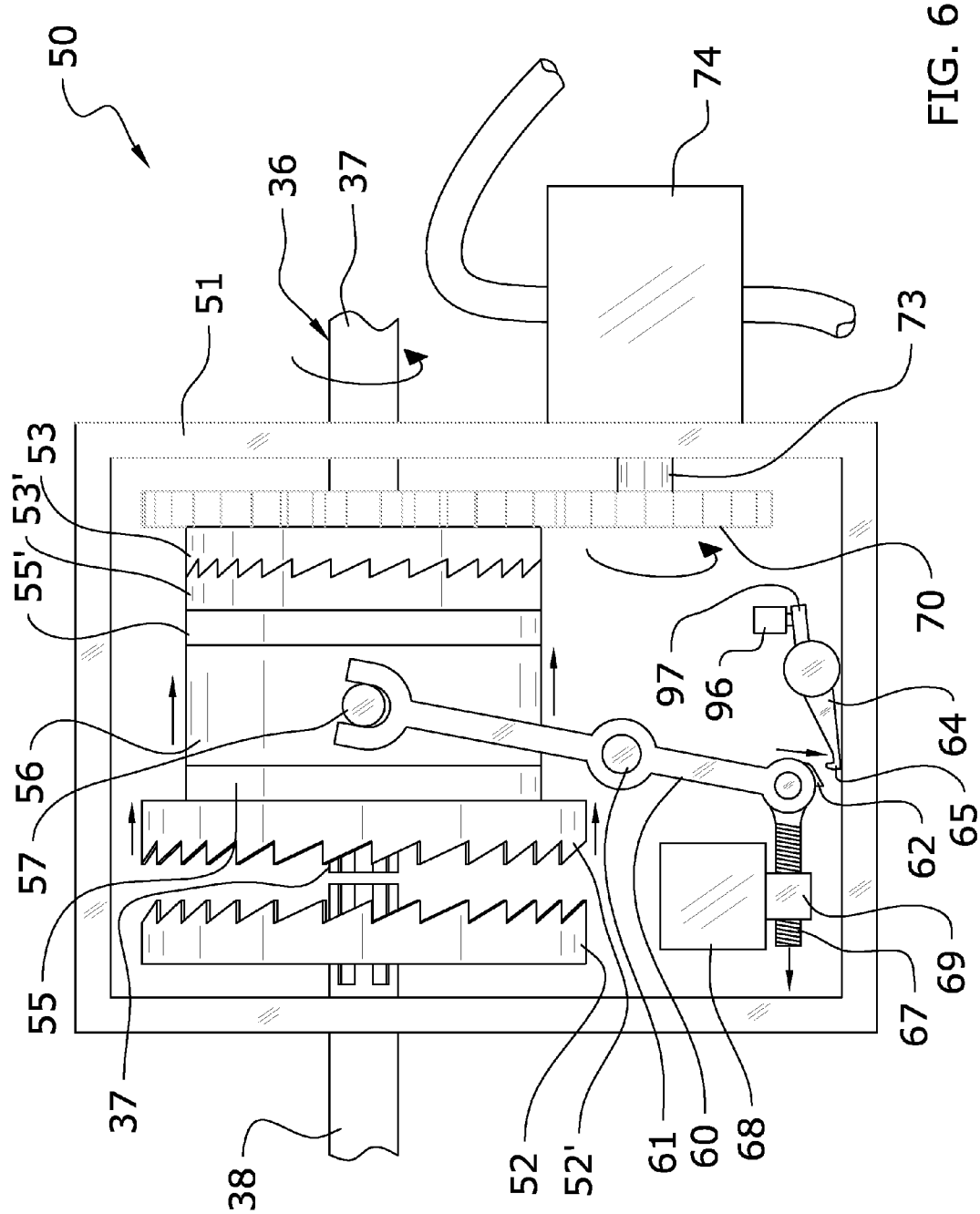
FIG. 6 is an illustration of the bypass assembly during operation of the auxiliary tail rotor as shown in FIG. 4 and FIG. 5.
Figure 7:
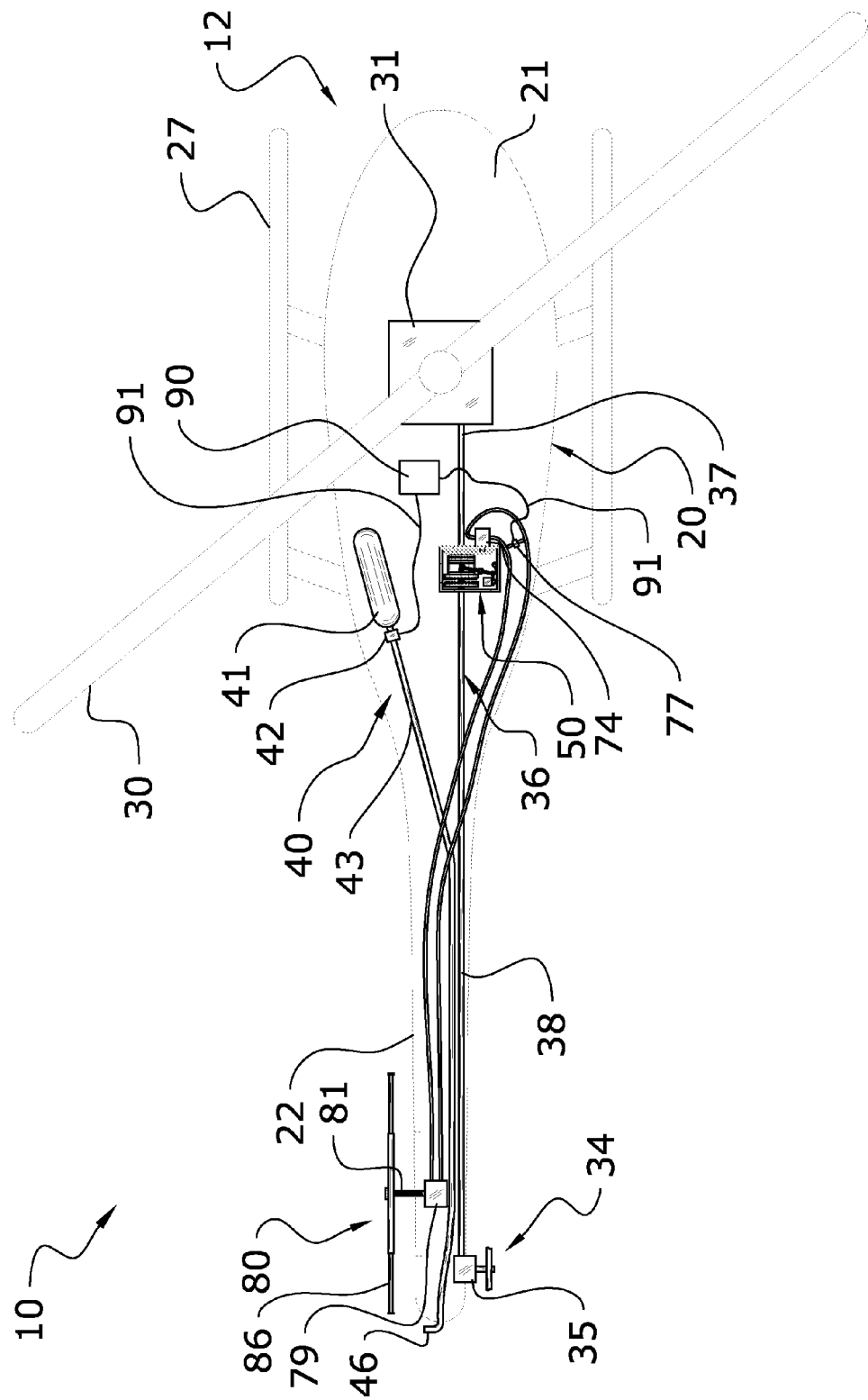
FIG. 7 is a functional diagram of the present invention within a helicopter and during operation of the auxiliary tail rotor.
Figure 8:
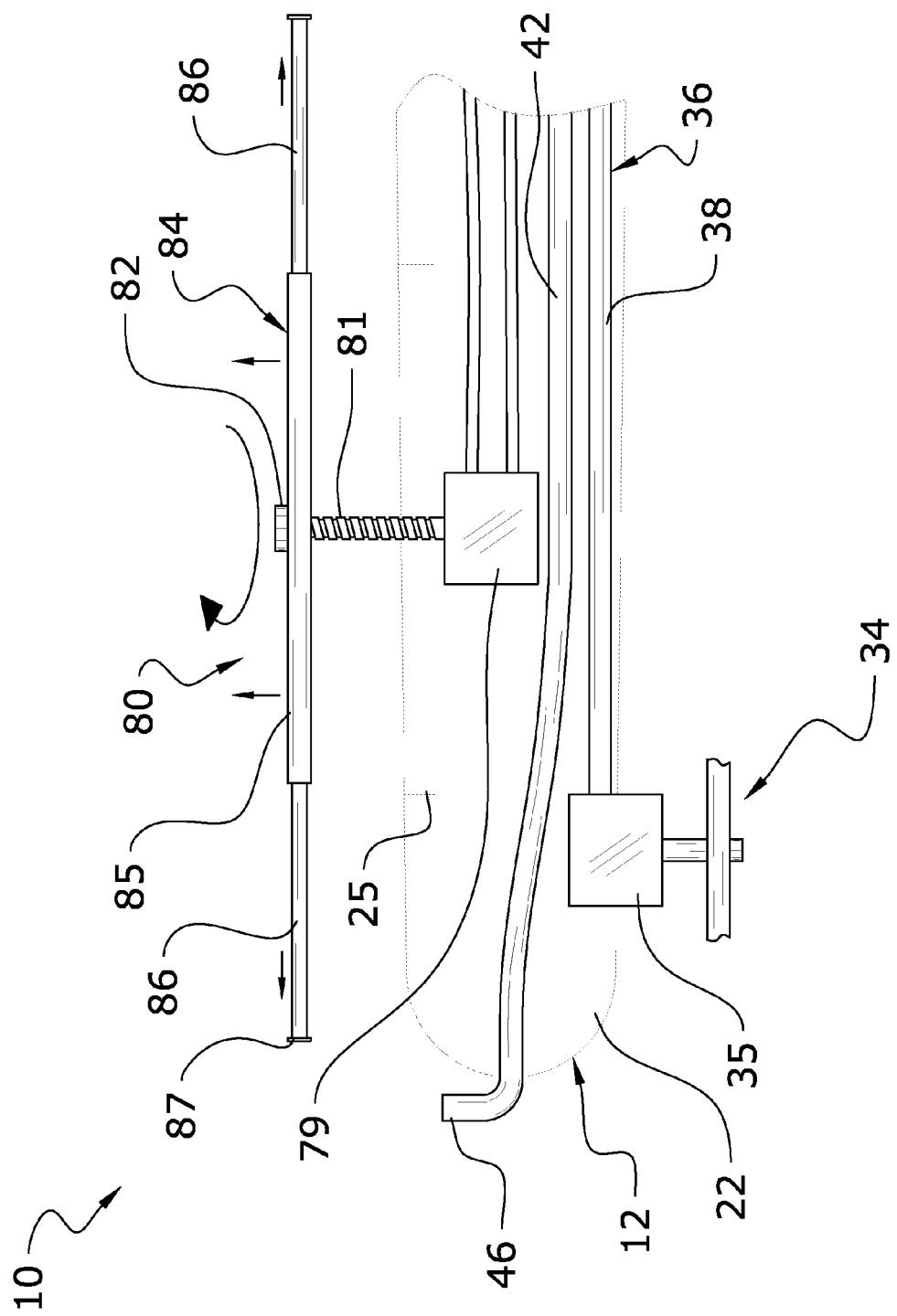
FIG. 8 is an illustration of the present invention illustrating the auxiliary tail rotor moved to an outward position along the shaft and showing the blades being telescopically expanded (second position).

Turning now descriptively to the drawings, in which similar reference characters denote similar elements throughout the several views, FIGS. 1 through 8 illustrate a helicopter auxilary anti-torque system 10, which comprises a fluid thrust assembly 40 selectively engageable onboard the helicopter 12, an auxiliary tail rotor 80 selectively engageable onboard the helicopter 12, and at least one controller 90 to operate the fluid thrust assembly 40 and the auxiliary tail rotor 80 to effect a controlled anti-torque force of the tail boom 22 during failure of the primary tail rotor 34. The fluid thrust assembly 40 projects a non flammable fluid 49 from the tail boom 22 of the helicopter 12. The auxiliary tail rotor 80 is collapsible within the tail boom 22 of the helicopter 12 when not in use. The fluid thrust assembly 40 and the auxiliary tail rotor 80 may be automatically activated in the case of the primary tail rotor 34 failure, or activated by the pilot of the helicopter 12 via one or more switches.

B. Helicopter Body

The helicopter body 20 is generally comprised of a conventional type and may include various components or designs common to many different types of helicopters. Among those are generally a fuselage 21 and a tail boom 22 extending from the fuselage 21. The helicopter 12 also generally includes landing skis 27 and many of the other components common to conventional helicopters.

In addition, the helicopter 12 preferably includes a pocket 25 near the rear end of the tail boom 22, preferably upon the opposite side as the primary tail rotor 34 for enclosing the auxiliary tail rotor 80 during non use periods. The pocket 25 may completely enclose the auxiliary tail rotor 80 or enclose only a portion such as the blades 84. The pocket 25 may further be open to an external environment or have a movable door or gate to completely enclose all or a portion of the auxiliary tail rotor 80 during non use.

C. Main Rotor and Primary Tail Rotor

The helicopter 12 includes a main rotor 30 over the fuselage 21 which generally acts as the primary lifting rotor for the helicopter 12 and is standard upon most helicopters. The main rotor 30 is powered through an engine 31 also generally located in the fuselage 21. The engine 31 also rotates an elongated shaft 36 which extends to the tail boom 22 of the helicopter 12 and is used to rotate the primary tail rotor 34. The shaft 36 is preferably interconnected to the primary tail rotor 34 through the use of a gearbox 35 located at the front end of the tail boom 22 in-line with the primary tail rotor 34.

The shaft 36 is preferably separated into two components, namely a first portion 37 and a second portion 38. The first portion 37 and the second portion 38 are removably connected depending on if the primary tail rotor 34 is being used or the auxiliary tail rotor 80. The first portion 37 and the second portion 38 are linear with each other and preferably have a splined or keyed structure near the separation point of the first portion 37 and the second portion 38, which is generally located within the housing 51 of the bypass assembly 50.

D. Fluid Thrust Assembly

The fluid thrust assembly 40 is used during an initial disengagement or damaging of the primary tail rotor 34 to regain control and stop or prevent the helicopter 12 from going into a spin. The fluid thrust assembly 40 generally includes a pressurized reservoir 41 (e.g. tank), which is preferably located within the fuselage 21, but may be located within the tail boom 22. The reservoir 41 holds a fluid 49 which is ejected to provide a thrust which has an anti-torque effect upon the helicopter 12.

Leading from the reservoir 41 are one or more supply lines 43. The supply lines 43 are directed through or along the tail boom 22 to a rearward end of the tail boom 22. At the end of the supply lines 43 is a high pressure nozzle 46. The nozzle 46 is directed out the opposite side of the tail boom 22 as the primary tail rotor 34. One or more valves 42 are also generally located upon the supply lines 43 for releasing the fluid 49 from the reservoir 41 towards the nozzle 46. The valves 42 are generally electrically controlled via the controller 90, however the valves 42 may be manually controlled in various embodiments. The nozzle 46 may be of movable type construction and be computer controlled to apply lifting-lowering force or other position to the helicopter 12 thus making the helicopter 12 lever and/or more flyable.

The fluid 49 used with the fluid thrust assembly 40 is preferably comprised of a non flammable type to prevent the possibility of the reservoir 41 exploding or the fluid 49 sprayed from the nozzle 46 from catching fire. An example of a suitable fluid 49 is water, such as but not limited to including pressurized liquid water or steam. It is appreciated that other types of non flammable fluids may also be used.

E. Bypass Assembly

The bypass assembly 50 is located along the shaft 36 that connects the engine 31 to the primary tail rotor 34. The bypass assembly 50, when activates, disengages the primary tail rotor 34 and engages the auxiliary tail rotor 80. The shaft 36 is split within the housing 51 of the bypass assembly 50 into the first portion 37 and the second portion 38 and is comprised of a spline or keyed structure within the housing 51 to rotatably couple and disconnect as desired.

In the preferred embodiment of the bypass assembly 50, a pair of toothed primary gears 52, 52' couple together when the primary tail rotor 34 of the helicopter 12 is in use. When the primary gears 52, 52' are locked together, the first portion 37 and the second portion 38 of the shaft 36 are rotatably coupled to allow the engine 31 to rotate the second portion 38 of the shaft 36 which in turn transfers the rotation to the gearbox 35 to rotate the primary tail rotor 34. When the primary tail rotor 34 becomes damaged, the primary gears 52, 52' are disengaged, thus disengaging the first portion 37 and the second portion 38 of the shaft 36, and a pair of toothed auxiliary gears 53, 53' couple together to engage the auxiliary tail rotor 80.

The inwardly positioned auxiliary gear 53' and primary gear 52' are generally mechanically connected via a plurality of bearings 55, 55' or other connecting structure 56. A shift lever 60 is connected to the connecting structure 56 which is in turn held in a pivotal orientation via a locking arm 64. The rotatable locking arm 64 includes a hook 65 which grasps on a catch 62 at the end of the shift lever 60 opposite the connecting structure 56. The shift lever 60 is also connected to an elongated member 67 which in turn is connected to a motor 68 (e.g. hydraulic pump) including an actuator 69 at an end opposite the connecting structure 56. The shift lever 60 may connect to the connecting structure 56 in various manners, such as through the use of a fork structure grasping a connector 57 of the connecting structure 56. Additional bearings may also exist at outward locations from outward primary gear 52 and the auxiliary gear 53 along the shaft 36.

To disengage the primary gears 52, 52' and engage the auxiliary gears 53, 53', the reversible motor 68, preferably electric and ran via onboard batteries, within the housing 51 is activated via a control within the cockpit of the helicopter 12 or automatically via sensors detecting failure of the primary tail rotor 34. The electromagnet has the same source of power as the motor 68 and instantly moves the hooked lever 60 on pivot 61 to an unlocked position allowing the motor 68 to move the lever 60.

As the shift lever 60 pivots, the shift lever 60 moves the connecting structure 56, connected bearings 55, 55', and connected gears 52, 52' toward an opposite arrangement. One such arrangement comprises toward the auxiliary gears 53, 53'. Thus, the primary gears 52, 52' are disengaged, which disengages the connected splined shaft 36 leading towards the primary tail rotor 34, and the auxiliary gears 53, 53' are engaged via moving the inward auxiliary gear 53' toward and against the outward auxiliary gear 53. It is appreciated that various clutch assemblies may be used to switch from using the primary gears 52, 52' to the auxiliary gears 53, 53' when switching from the primary tail rotor 34 to the auxiliary tail rotor 80 when the primary tail rotor 34 is damaged.

Both of the auxiliary gears 53, 53' now rotate with the first portion 37 of the shaft 36 coming from the engine 31. A chain and sprocket or gear assembly 70 is mechanically connected to the auxiliary gears 53, 53', which also now circulates. The sprocket assembly 70 is connected to a shaft 73 leading to a pump 74, preferably of a hydraulic type. The hydraulic pump 74 is now powered which supplies hydraulic fluid to the hydraulic motor 79 used to engage the auxiliary tail rotor 80 and move the auxiliary tail rotor 80 to an active position.

The locking arm 64 may additionally or alternately include a metal element 97 (or other element attracted to the electromagnet 96) extending therefrom, preferably opposite the hook 65, to allow activation of the locking arm 64 via an adjacent electromagnet 96. The electromagnet 96 is energized by the controller 90 to cause the metal element 97 to move against the electromagnet 96 and locking arm 64 to pivot. When the electromagnet 96 is not energized to locking arm 64 is able to pivot in a reverse direction.

F. Auxiliary Tail Rotor

The auxiliary tail rotor 80 is used after the initial thrust of the fluid thrust assembly 40 to stabilize the helicopter 12 and allow the operator of the helicopter 12 to safely land. The auxiliary tail rotor 80 is preferably located on an opposite side of the tail boom 22 as the primary tail rotor 34 and on a similar side as the nozzle 46 is directed. This helps to prevent any damaging object that damages the primary tail rotor 34 or loose pieces of the primary tail rotor 34 from damaging the auxiliary tail rotor 80 or nozzle 46 of the fluid thrust assembly 40. The auxiliary tail rotor 80 may also include a dust cover to prevent debris from engaging the blades 84 or threaded shaft 81.

The auxiliary tail rotor 80 is activated when the first portion 37 and the second portion 38 of the shaft 36 separate to engage the auxiliary gears 53, 53' and thus engage the hydraulic pump 74. The hydraulic pump 74 engages the hydraulic motor 79 which is directly connected to the auxiliary tail rotor 80. When the motor 79 engages, the motor 79 rotates the course threaded shaft 81 which causes the blades 84 of the auxiliary tail rotor 80 to move outwardly from the pocket 25 to outside of the tail boom 22 on an opposite side as the primary tail rotor 34.

A rubber stopper 82 is located at an end of the threaded shaft 81 to prevent the blades 84 from rotating off of the shaft 81. The blades 84 are preferably comprised of telescopic or collapsible structure. As the blades 84 are moved external to the tail boom 22, centrifugal and rotational forces cause the blades 84 to expand in diameter. In the preferred embodiment, inner members 86 slide outwards from within outer members 85 to increase the diameter of the rotating blades 84. It is appreciated that multiple blades 84 and thus inner members 86 and outer members 85 may be used with the auxiliary tail rotor 80. Each of the inner members 86 also generally include end caps 87 to prevent debris from entering within the blades 84 when in the retracted and expanded position.

The rotation of the auxiliary tail rotor 80 is preferably controlled in a similar manner as the standard primary tail rotor 34. Alternately the bypass valve 77 or other means may be used to control the auxiliary tail rotor 80. The operator is able to adjust the speed of the auxiliary tail rotor 80 to safely land the helicopter 12, using the bypass valve 77.

G. Controller

The present invention includes one or more controllers 90 to automate the fluid thrust assembly 40 and the auxiliary tail rotor 80 in the case of failure of the primary tail rotor 34 of the helicopter 12. The controllers 90 are connected to the valve 42 of the fluid thrust assembly 40, and bypass valve 77 of the bypass assembly 50 or electric motor 68 thereof by various types of signal lines 91 to transfer a signal of an electrical or fluid type therebetween. The controller 90 may be activatable by the pilot of the helicopter 12 within the cockpit or may automatically engage due to sensors detecting that the primary tail rotor 34 has been damaged or is failing to operate properly. The helicopter 12 may include push buttons, touch screens, display screens, gauges, switches, knobs, foot pedals, or various other types of control structures to operate the present invention. The controller 90 may have push buttons (not illustrated) for manual activation of the controller 90.

In the preferred embodiment, when the primary tail rotor 34 becomes damaged or fails to operate properly, a sensor detects the failure of the primary tail rotor 34 and indicates the previous to the pilot via a light, sound, etc. The pilot then engages a switch which causes the fluid thrust assembly 40 to activate and then automatically disengages the primary tail rotor 34 and engages the auxiliary tail rotor 80 in a subsequent manner. It is appreciated that multiple controllers 90 or switches may be used in alternate embodiments. It is also appreciated that a delay of approximately 5 seconds exist between the engagement of the fluid thrust assembly 40 and the auxiliary tail rotor 80. Magnetic clutches, momentary switches, or various other mechanical components may also be used to engage the anti-torque fluid thrust assembly 40 and/or the auxiliary tail rotor 80.

H. Operation of Preferred Embodiment

In use, once an object strikes the primary tail rotor 34, or the primary tail rotor 34 becomes damaged or fails, vibration sensors or a pilot tube cause a warning light to turn on and also energize the system. The pilot then engages a switch which causes the controller 90 to automate the fluid thrust assembly 40 and reservoir 41 causing the high pressure nozzle 46 to project the fluid 49 outward from the tail boom 22 of the helicopter 12 which stops a recoil or prevents the helicopter 12 from going into a spin. Also, the controller 90 may have capacity to start the operation of the present invention automatically if the pilot is momentarily unable to activate the start switch or stop a spin of the helicopter 12. Sensors would detect a rotor 34 failure or spin of the helicopter and activate the present invention automatically.

Subsequently, the controller 90 separates the positive drive radial spline shaft 36 disconnecting the engine 31 and the damaged primary tail rotor 34 via separating the primary gears 52, 52' within the bypass assembly 50. The auxiliary gears 53, 53' then connect thus providing a rotational force to the hydraulic pump 74 which activates to deliver hydraulic fluid to the motor 79 of the auxiliary tail rotor 80. The pump 74 pressure is able to build up instantly via closing bypass valves 77 and the bypass valves 77 allow for the control of the hydraulic fluid to the motor 79 and thus speed of the auxiliary tail rotor 80.

The auxiliary tail rotor 80 is preferably not engaged until the helicopter 12 clears the damaging object, wherein the fluid thrust assembly 40 is used to stabilize the helicopter 12 when near the damaging object. Once clear of the object, the hydraulic motor 79 is operated by the pilot to turn the threaded shaft 81 attached to the motor 79 forcing the auxiliary blades 84 out of the protective pocket 25 to clear the side of the tail boom 22.

The blades 84 continue to threadably move outwards until engagement with the stopper 82. Once the blades 84 are at an outward most position relative the shaft 81, centrifugal forces cause the blades 84 to telescopically expand outwards thus increasing the diameter of the blades 84. The pilot is able to operate the hydraulic motor 79 in a similar manner as the standard primary tail rotor 34 to safely control the helicopter 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A helicopter auxiliary anti-torque system, comprising:
   a helicopter including a fuselage and a tail boom extending from said fuselage;
   wherein said helicopter includes a main rotor extending from said fuselage and a primary tail rotor directed out either side of said tail boom;
   a fluid thrust assembly selectively engageable onboard said helicopter;
   wherein said fluid thrust assembly includes a reservoir and a nozzle fluidly connected to said reservoir and wherein said nozzle is directed out said either side of said tail boom;
   an auxiliary tail rotor selectively engageable onboard said helicopter;
   wherein said auxiliary tail rotor is directed out said either side of said tail boom; and
   at least one controller to operate said fluid thrust assembly and said auxiliary tail rotor to effect an anti-torque force of said tail boom during failure of said primary tail rotor.

2. The helicopter auxiliary anti-torque system of claim 1, wherein said fluid thrust assembly projects a non flammable fluid.

3. The helicopter auxiliary anti-torque system of claim 2, wherein said non flammable fluid is comprised of pressurized water.

4. The helicopter auxiliary anti-torque system of claim 1, wherein said nozzle is directed out of said tail boom similar to said primary rotor to expend a force in a same direction as said primary rotor.

5. The helicopter auxiliary anti-torque system of claim 1, wherein at least a portion of said auxiliary tail rotor is collapsed within said tail boom in a first position and wherein said at least a portion of said auxiliary tail rotor is expanded externally of said tail boom in a second position.

6. The helicopter auxiliary anti-torque system of claim 5, wherein said auxiliary tail rotor includes a threaded shaft and a plurality of blades.

7. The helicopter auxiliary anti-torque system of claim 6, wherein said plurality of blades threadably move along said threaded shaft when changing from said first position to said second position.

8. The helicopter auxiliary anti-torque system of claim 7, wherein said tail boom includes a pocket, wherein said plurality of blades are positioned within said pocket in said first position.

9. The helicopter auxiliary anti-torque system of claim 5, wherein said auxiliary tail rotor includes a plurality of blades, wherein said plurality of blades expand telescopically.

10. The helicopter auxiliary anti-torque system of claim 1, wherein said auxiliary tail rotor is directed out an opposite side of said tail boom as said primary tail rotor.

11. The helicopter auxiliary anti-torque system of claim 1, including a bypass assembly to mechanically disconnect said primary tail rotor from an engine of said helicopter and mechanically connect said auxiliary tail rotor to said engine of said helicopter.

12. The helicopter auxiliary anti-torque system of claim 1, wherein said at least one controller automatically engages said fluid thrust assembly prior to said auxiliary tail rotor.

13. A helicopter auxiliary anti-torque system, comprising:
   a helicopter including a fuselage and a tail boom extending from said fuselage;
   wherein said helicopter includes a main rotor extending from said fuselage and a primary tail rotor directed out a first side of said tail boom;
   a fluid thrust assembly selectively engageable onboard said helicopter;
   wherein said fluid thrust assembly includes a reservoir and a nozzle fluidly connected to said reservoir and wherein said nozzle is directed out a second side of said tail boom;
   wherein said fluid thrust assembly projects a non flammable fluid;
   an auxiliary tail rotor selectively engageable onboard said helicopter;
   wherein at least a portion of said auxiliary tail rotor is collapsed internal said tail boom in a first position and wherein said at least a portion of said auxiliary tail rotor is expanded external said tail boom in a second position;
   wherein said auxiliary tail rotor is directed out said second side of said tail boom; and
   at least one controller to operate said fluid thrust assembly and said auxiliary tail rotor to effect an anti-torque force of said tail boom during failure of said primary tail rotor.

14. The helicopter auxiliary anti-torque system of claim 13, wherein said auxiliary tail rotor includes a threaded shaft and a plurality of blades.

15. The helicopter auxiliary anti-torque system of claim 14, wherein said plurality of blades threadably move along said threaded shaft when changing from said first position to said second position.

16. The helicopter auxiliary anti-torque system of claim 15, wherein said tail boom includes a pocket, wherein said plurality of blades are positioned within said pocket in said first position.

17. The helicopter auxiliary anti-torque system of claim 13, wherein said auxiliary tail rotor includes a plurality of blades, wherein said plurality of blades expand telescopically via centrifugal force.

18. The helicopter auxiliary anti-torque system of claim 13, including a bypass assembly to mechanically disconnect said primary tail rotor from an engine of said helicopter and mechanically connect said auxiliary tail rotor to said engine of said helicopter.

19. The helicopter auxiliary anti-torque system of claim 13, wherein said at least one controller automatically engages said fluid thrust assembly prior to said auxiliary tail rotor.

20. A helicopter auxiliary anti-torque system, comprising:
   a helicopter including a fuselage and a tail boom extending from said fuselage;
   wherein said helicopter includes a main rotor extending from said fuselage and a primary tail rotor directed out a first side of said tail boom;
   wherein said helicopter includes at least one engine to power said main rotor and said primary tail rotor;
   wherein said helicopter includes a shaft connecting said engine to said primary tail rotor;
   wherein said shaft includes a first portion and a second portion, wherein said first portion is separable from said second portion and wherein said first portion and said second portion each include a radial spline structure for rotatably coupling;
   a fluid thrust assembly selectively engageable onboard said helicopter;

wherein said fluid thrust assembly includes a reservoir and a nozzle fluidly connected to said reservoir and wherein said nozzle is directed out a second side of said tail boom;

wherein said fluid thrust assembly projects a non flammable fluid;

an auxiliary tail rotor selectively engageable onboard said helicopter;

wherein at least a portion of said auxiliary tail rotor is collapsed internal said tail boom in a first position and wherein said at least a portion of said auxiliary tail rotor is expanded external said tail boom in a second position;

wherein said auxiliary tail rotor includes a threaded shaft and a plurality of blades;

wherein said plurality of blades threadably move along said threaded shaft when changing from said first position to said second position;

wherein said tail boom includes a pocket, wherein said plurality of blades are positioned within said pocket in said first position;

wherein said plurality of blades expand telescopically;

wherein said auxiliary tail rotor is directed out said second side of said tail boom;

a bypass assembly to mechanically disconnect said primary tail rotor from an engine of said helicopter and mechanically connect said auxiliary tail rotor to said engine of said helicopter;

wherein said bypass assembly is located along said shaft adjacent a separation point of said first portion and said second portion;

wherein said bypass assembly includes a pair of primary gears, wherein said pair of primary gears are rotated when said first portion is rotatably coupled to said second portion;

wherein said bypass assembly includes a pair of auxiliary gears, wherein said pair of auxiliary gears are rotated when said first portion is disconnected from said second portion;

wherein said bypass assembly includes a shift lever to disconnect and connect said first portion and said second portion of said shaft;

wherein said bypass assembly includes a locking arm to secure said shift lever in place;

wherein said bypass assembly has an electromagnet energized by said controller to unlock said shift lever;

wherein said bypass assembly includes a first motor to operate said shift lever;

wherein said bypass assembly includes a hydraulic pump mechanically connected to said auxiliary gears and operable when said first portion is disconnected from said second portion;

wherein said auxiliary tail rotor is operable via rotation of said first portion of said shaft; and at least one controller to operate said fluid thrust assembly and said auxiliary tail rotor to effect an anti-torque force of said tail boom during failure of said primary tail rotor;

wherein said at least one controller automatically engages said fluid thrust assembly prior to said auxiliary tail rotor.

\* \* \* \* \*